D. A. URIE.
RECEPTACLE FILLING MACHINE.
APPLICATION FILED DEC. 23, 1918.
1,343,696. Patented June 15, 1920.
3 SHEETS—SHEET 3.
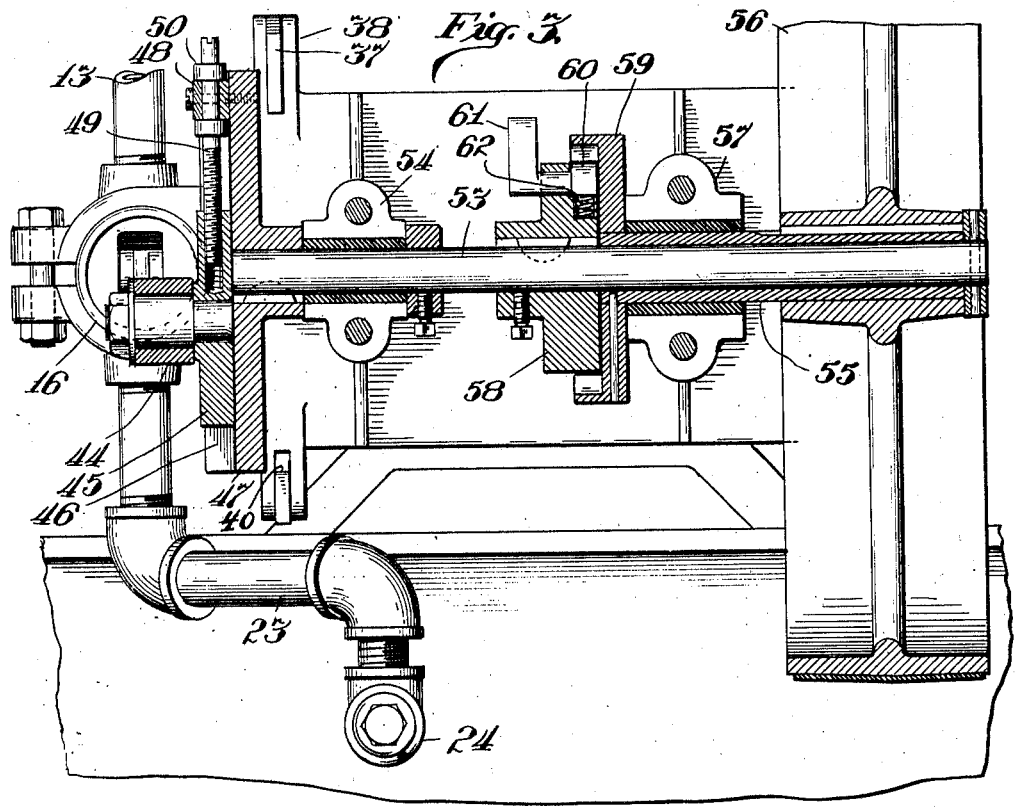
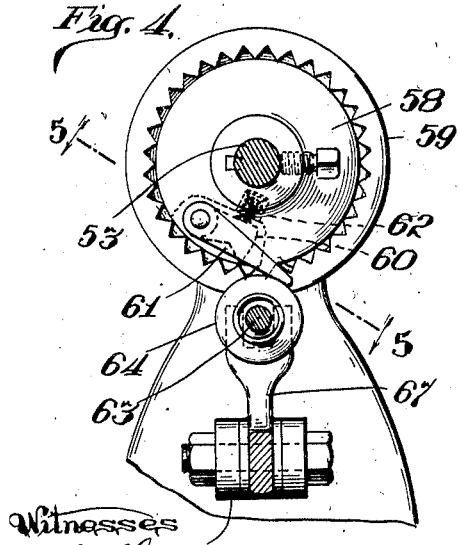
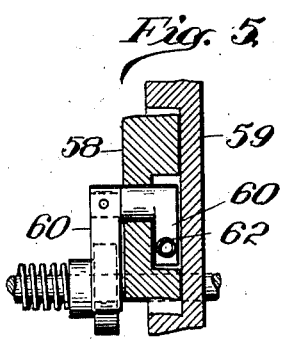
Witnesses
Milton Lenou
H. A. Horell
Inventor
David A. Urie,
By Heideman Street
Attorneys.

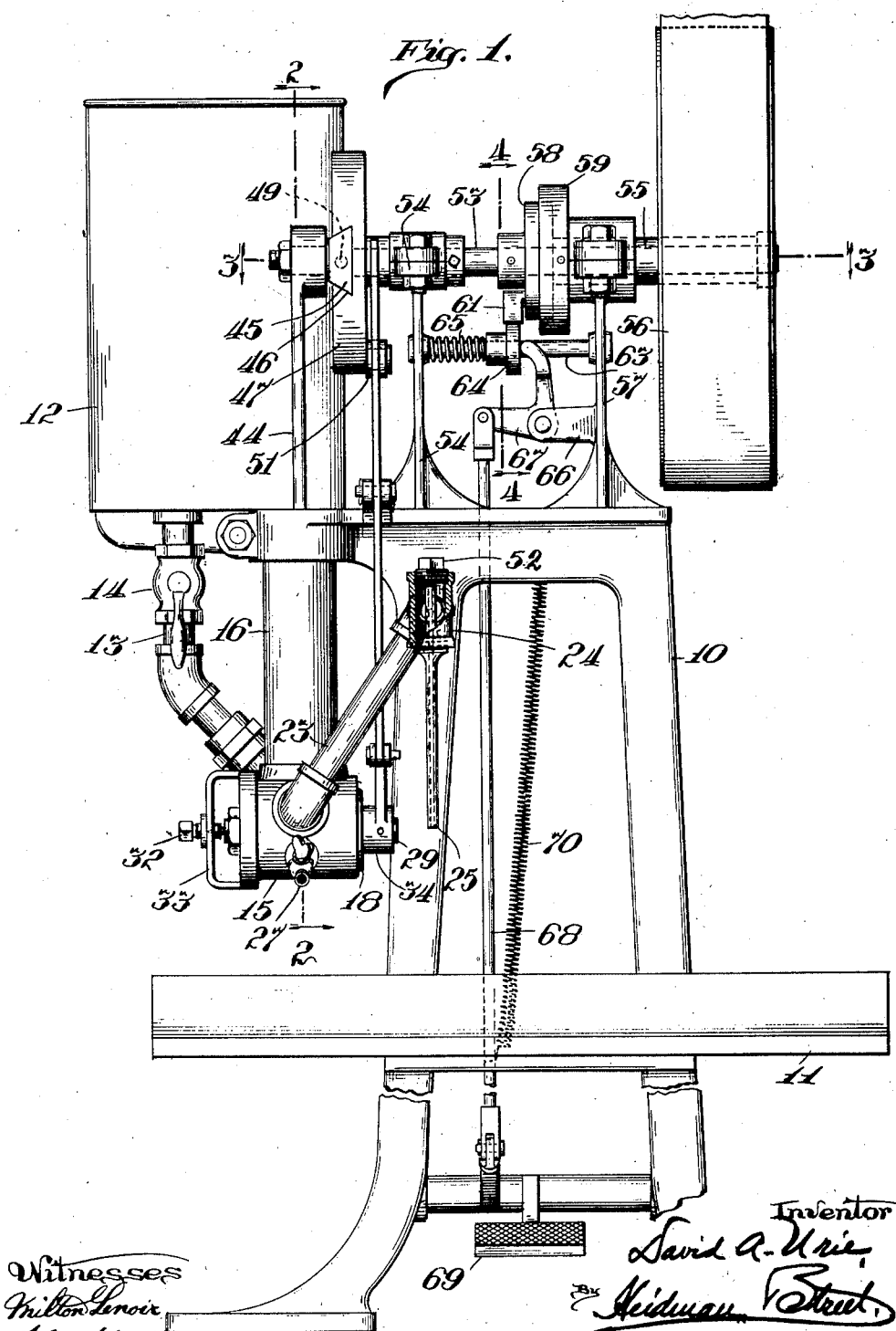

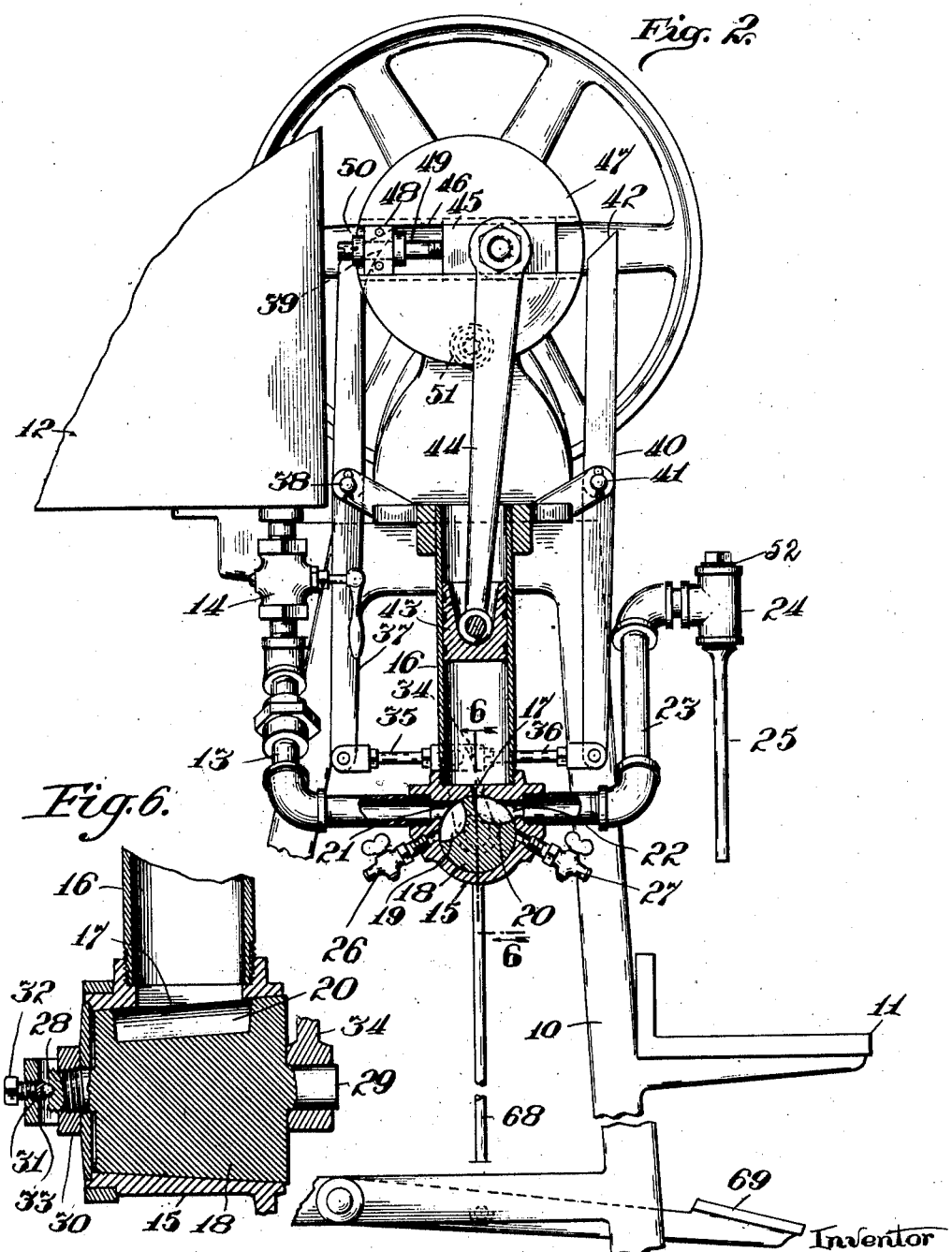

UNITED STATES PATENT OFFICE.

DAVID A. URIE, OF CHICAGO, ILLINOIS.

RECEPTACLE-FILLING MACHINE.

1,343,696. Specification of Letters Patent. Patented June 15, 1920.

Application filed December 23, 1918. Serial No. 267,896.

*To all whom it may concern:*

Be it known that I, DAVID A. URIE, a citizen of the United States, and a resident of Chicago, in the county of Cook and State of Illinois, have invented certain new and useful Improvements in Receptacle-Filling Machines, of which the following is a description, reference being had to the accompanying drawings, which form a part of my specification.

My invention relates to a machine more particularly adapted for the filling of bottles and the like with fluid; the invention having for its object the provision of a construction which, within certain limitations, may be readily adjusted to fill containers or bottles of different capacity or size, as for example from a half ounce bottle to say a half pint; variations beyond the limitations mentioned being accomplished or taken care of by slight alterations in certain elements of the machine, as will be readily comprehended.

Another object of my invention is the provision of a machine of the class referred to wherein the liquid-controlling mechanism or valve will be speedy and positive in its operation; the discharge of the liquid, or filling of the receptacle or bottle, being in a positive manner rather than through the action of gravity; at the same time the mechanism is of such nature and action that an even filling of receptacles or bottles of a given size or capacity will at all times be accomplished and any excess discharge or drip at the delivery end of the machine entirely eliminated.

The invention also contemplates a machine adapted to have greater filling capacity than machines heretofore employed; while at the same time a machine is provided which may be easily operated and the discharge or receptacle supply quickly regulated without necessitating the replacement of any of the parts thereof.

The above enumerated objects and advantages, as well as other advantages inherent in the construction, will be more fully comprehended from the following detailed description of the accompanying drawings, wherein:—

Figure 1 is a side elevation of my improved machine, with the discharge member partially in section.

Fig. 2 is a vertical sectional view, taken substantially on the line 2—2 of Fig. 1.

Fig. 3 is a sectional view, taken on the line 3—3 of Fig. 1.

Fig. 4 is a detail sectional view, taken substantially on the line 4—4 of Fig. 1.

Fig. 5 is a sectional view, taken substantially on the line 5—5 of Fig. 4.

Fig. 6 is a detail sectional view of the fluid-controlling valve or mechanism taken on the line 6—6 in Fig. 2 looking in the direction of the arrows.

The machine may be provided with any suitable supporting standard or frame; and any suitable driving mechanism or power-imparting means may be employed, adapting the machine to varying conditions and uses, as will be readily understood.

In the particular exemplification of the invention as illustrated in the drawings, I have shown a frame composed of suitable uprights or standards 10 provided with a suitable tray or table, as at 11, arranged preferably to extend transversely of the frame at the front of the machine and beneath the discharge-spout or mechanism of the machine. The tray or table may be either permanently secured so as to adapt the machine to receptacles or bottles of a given size; or the table or tray may be made adjustable in a vertical direction so as to permit receptacles or bottles of varying sizes to be filled by the machine.

Secured in any suitable manner at the upper end of the frame or standards, I provide a suitable receptacle or vessel 12 intended to contain the fluid with which the containers or bottles are to be filled. The bottom of the receptacle or vessel 12 is provided with an outlet pipe 13 containing a suitable valve, as at 14, whereby the flow from the vessel 12 may be prevented when the machine is not in operation. The outlet pipe 13 leads to a valve-casing 15 provided with three outlets or ports disposed in opposite directions, as more clearly seen in Fig. 2. The casing 15 has a cylinder 16 secured thereto; the lower end of the cylinder being in communication with one port or passage 17 of the casing or shell 15. The valve-shell 15 is provided with a tapered cylindrical or plug-valve 18, the periphery whereof, at predetermined points, is provided with the dished-out portions or passages 19 and 20; the dished-out portion 19 being of a size sufficient to bring a port 21, with which pipe 13 communicates, into communication with the port 17 which leads to the cylinder 16; while the dished-out portion or passage 20 of the valve is of a size sufficient to bring port 17 into communication with a port 22 which leads to a pipe 23, which latter in turn is connected with a cup-member 24 which is provided with a discharge tube or stem 25. The wall of valve 18, intermediate of the passages or cut-out portions 19 and 20 is of such width as to fully cover port 17 when the valve 18 is rotated into proper position, in order that a complete shut-off of port 17 may be had in the oscillatory movement of valve 18, which is accomplished by mechanism later to be described. The bridge or wall, intermediate of passages 19 and 20 of valve 18 is at the same time of such size as to necessitate a very small movement of the valve in order to establish communication between cylinder 16 and either pipe 13 or 23.

At suitable points, the shell 15 of this valve is shown as preferably provided with suitable drain-cocks 26 and 27 so placed that a complete drain of the passages 19 and 20 and their communicating passages may be had when desired.

The plug-valve 18 has both ends provided with trunnions 28 and 29; the trunnion 28 being shown preferably provided with threads and disposed through an end wall of the shell 15, where the trunnion 28 is provided with a suitable washer, as at 30. This end of the trunnion 28 is shown provided with a slight socket to receive a ball 31 which is maintained in place by the socketed set-screw 32, shown screwed through the yoke 33 which is suitably secured to the shell 15 of the valve.

The trunnion 29 is provided with an arm 34, to which is secured, in any suitable manner, a pair of oppositely disposed arms 35 and 36, see Fig. 2. The arm 35 is pivotally connected to a lever 37 which latter in turn is pivotally connected at the point 38 to a suitable lug or bracket provided on the frame or standard of the machine. The upper end of the lever 37 is provided with a curvature of a given degree, which, in the machine illustrated, is approximately 45 degrees, as shown at 39; the curved end being disposed in a directon toward the opposite side of the cylinder 17. The arm 36 is pivotally connected at its outer end to a lever 40 which latter is pivotally mounted at the point 41 to a suitable bracket formed on the frame or standard of the machine. The upper free end of the lever 40 is provided with a bevel of a given degree, which, in the particular machine, is preferably substantially 45 degrees, as shown in Fig. 2 at 42; the bevel being in a direction toward the opposite side of the cylinder 16, namely so as to be disposed toward the curved end 39 of lever 37.

The cylinder 16 is provided with a suitable piston 43 to which is connected piston-rod 44, the upper end whereof is pivotally connected to a block 45 which is adjustably seated in a groove 46 disposed transversely of a disk 47; the block 45 being preferably dove-tailed into the disk 47, as more clearly shown in Fig. 1. One end of groove 46 is provided with a block 48, secured against movement and provided with an aperture therethrough to receive the unthreaded end of a screw-rod 49, one end whereof has controlling or threaded connection with block 45; the unthreaded end is provided with a pair of collars or flange, as at 50, disposed on opposite sides of block 48 whereby longitudinal movement of the screw-rod 49 is prevented, while the block 45 is caused to move lengthwise of the screw-rod 49 and hence its position in the groove 46, determined and maintained.

With this construction, it is apparent that the block 45 may be adjusted lengthwise of groove 46, namely toward the axis of disk 47 or toward the periphery thereof, by simply turning screw-rod 49 in the proper direction and then forcing nut or washer 50 tightly against block 48 after the adjusted position has been determined. With this construction, a variable stroke may be given pitman 44 and therefore piston 43; a minute stroke or movement of piston 43 being obtained by shifting block 45, to which pitman or rod 44 is connected, toward the axis of disk 47 and vice versa, when block 45 is shifted toward the periphery of the disk. With this construction, the intake and discharge action of piston 43 may be controlled and the quantity of fluid discharged by the machine regulated.

The disk 47, at a point adjacent the periphery thereof, is shown provided with a suitable striker lug or roller 51 which is adapted to engage with the free ends of levers 37 and 40 when the latter are brought into the path of the striker 51; the arrangement being such that the levers 37 and 40 will alternately be moved into the path of the striker element 51 through its action on the free ends of said levers. As is apparent from Fig. 2, rotation of disk 47 in clockwise direction will cause roller 51 to strike the inwardly curved tip of lever 37 which, with the mechanism positioned as shown in Fig. 2, is disposed in the path of striker 51, thereby causing lever 37 to oscillate on its pivotal point 38 so as to force the lower end of the lever 37 toward cylinder 16 and by reason of its connection with arm 34 will therefore oscillate plug-valve 18 in clockwise direction in Fig. 2. Such oscillation of plug-valve 18 will cause lever 40 to oscillate about its pivotal point 41, through the action of arm 36 connected to the lower end of the lever 40, so that the upper beveled end 42 of lever 40 will be forced toward disk 47 into the path of striker 51, which has moved so as to engage with the bevel 42 of lever 40, thereby forcing the upper end of lever 40 out of its path. Such oscillation of lever 40 causes valve 18 to be rotated in counter-clockwise direction, in other words, so as to bring ports 17 and 22 into communication, as shown in Fig. 2. This action also brings the upper end of lever 37 again into the path of the striker, as shown in Fig. 2. As is apparent from this construction, the valve 18 will be oscillated twice to each complete revolution of disk 47, at which time piston 43 will have been given a downward and upward reciprocation of predetermined length.

As is evident from the construction when the piston 43 is on its up-stroke in the cylinder 16, the valve 18 will have been rotated in clockwise direction in Fig. 2, through the action of striker 51 on the arcuate end of lever 37, thereby bringing ports 21 and 17 into communication with each other through passage 19 of the valve. This permits the fluid in vessel 12 to flow into cylinder 16, the flow being through the action of gravity as well as through the suction action of the piston, thus causing a positive quantity to be taken into the cylinder before the piston recedes and before the striker 51 is brought into contact with the beveled end 42 of lever 40. The engagement of striker 51 with the beveled end 42 of lever 40 causes valve 18 to be rotated in counter-clockwise direction which causes passage 20 to establish communication between ports 17 and 22, namely between cylinder 16 and cup-member 24. By providing lever 37 with an arcuate end disposed at an angle of approximately 45 degrees and providing lever 40 with a bevel of approximately 45 degrees, a rapid action of levers 37 and 40 is induced and therefore quick action of valve 18 results. The cup-member 24 is preferably arranged at an elevation above the lower part of cylinder 16, as clearly shown in Fig. 2, and the flow through the cup-member controlled by action of the piston 43, the downward stroke whereof places the fluid in cylinder 16 under pressure and causes a positive flow of the fluid through cup-member 24.

The cup-member 24, as shown in Figs. 1 and 2, comprises the cylindrical casing, one side whereof is in communication with pipe 23 while the bottom or lower end receives the tube 25 which is preferably removably secured in place and is arranged to extend upward within the cup-member 24, to a point near the top thereof, as shown in full lines in Fig. 1. The top end of cup-member 24 is shown provided with a removable cap 52.

With the construction just described, it is evident that the fluid must be forced upward within cup-member 24 before the fluid is enabled to flow through the tube 25 and allowed to discharge therefrom; the tube being adapted to enter the orifices of the containers or bottles that are to be filled. With the tube 25 extending to a point near the top of the cup member 24, it is evident that the top member will retain a certain amount of fluid and thus leave a very small air space above the fluid with which the tube 25 communicates, so that the initial upward stroke of the piston, due to the relation of the area of the piston to the smaller area in the upper end of the cup member, will induce sufficient amount of suction in the cup member to prevent any further escape or drip of the fluid from the tube 25 of the discharge member.

The piston 43 begins its upward stroke slightly in advance of the striker 51 engaging the curved end 39 of lever 37, so that a slight suction is caused in cylinder 16, pipe 23 and cup-member 24 and therefore also in tube 25 before valve 18 has been moved sufficiently so as to bring the wall intervening passages 19 and 20 to the right of port 17 in Fig. 2. This slight suction which has been created in pipe 23, cup-member 24 and tube 25 will prevent any drip from tube 25, and the discharge from tube 25 controlled to a nicety, with the result that an accurate or even filling of the bottles or containers is insured.

Where the containers or bottles are intended to be supplied with a greater quantity than would be the case with the mechanisms as adjusted in Fig. 2, or in other words, where larger bottles are to be filled, the block 45, to which piston 44 is connected, is adjusted lengthwise of groove 46 so as to move said block 45 in a direction toward the periphery of disk 47; the degree of movement being determined by the quantity of fluid it is desired to discharge from cup-member 24.

The disk 47 is secured to a shaft 53 which is suitably supported at one end in a standard or bracket 54, while the other end is supported in a sleeve 55 to which pulley 56 is keyed, as more clearly shown in Fig. 3. The sleeve has suitable bearing in a standard 57 secured to the frame of the machine.

The shaft 53 has a disk 58 secured thereto so as to rotate therewith; the disk being arranged concentric with the flanged or internally toothed disk 59 which is keyed or operatively secured to the sleeve 55 so as to rotate with the latter. The disk 58 is provided with a socket or cut-away portion in which a dog 60 is oscillatingly mounted; the dog being provided with a trunnion to which a pawl 61 is secured and disposed along the side of the disk 58, as shown in Figs. 3 to 5. The dog 60 is under constant pressure so as to be forced into mesh with the internal teeth of disk 59 by means of a spring 62, see Figs. 4 and 5; the engagement of dog 60 with the teeth of disk 59 inducing disk 58 to rotate with disk 59 and hence cause shaft 53 to rotate with sleeve 55.

The standards 54 and 57, in the particular exemplification, are shown provided with a rod 63 on which is slidably mounted roller or member 64 which is normally held in operative position, by means of a spring 65, see Fig. 1, namely in position where the roller 64 will be in the path of and therefore have operative contact with the pawl 61, as shown more clearly in Fig. 4. The roller 64 when in normal position will be engaged by the end of pawl 61, during the rotation of shaft 53, and be tilted thereby and thus cause dog 60 to be oscillated or tilted against the action of its spring 62, to-wit out of operative engagement with the internal teeth of disk 59. Such movement of dog 60 disrupts the operative relation between shaft 53 and sleeve 55, so that further rotation of shaft 53 and the operation of the mechanisms controlled thereby will be prevented.

Secured to standard 57 is a lug 66 on which is pivotally mounted bell-crank lever 67. One end of lever 67 is shown bifurcated, and preferably slightly arcuate, see Fig. 1, so as to straddle rod 63 and also engage with a side of member 64. The other end of lever 67 has a reach rod 68 pivotally secured thereto, which in turn is pivotally secured to a foot-treadle 69 suitably mounted in the lower part of the frame of the machine; the normal or raised position of the treadle, reach-rod, as well as the normal position of bell-crank lever 67 being controlled by means of a spring 70.

Assuming that power is transmitted to pulley 56, in order to place the machine in operation, the operator, after having placed a bottle or container beneath discharge tube 25, depresses foot-lever 69 sufficiently to cause bell-crank lever 67 to force member 64 out of engagement with the end of pawl 61 and therefore out of the path thereof. The foot treadle 69 is then released. The disengagement of member 64 with pawl 61 immediately causes dog 60, through the action of spring 62, to engage with the internal teeth of disk 59, thus throwing shaft 53 into operative relation with sleeve 55 on which pulley 56 is secured. This operative relation between the shaft 53 and sleeve 55 will maintain until the disks 58 and 59 have made a complete revolution, when pawl 61 will come into striking engagement with and be actuated by member 64 which has returned to its normal position through the action of spring 65; the return to normal position of member 64 taking place immediately upon the release of foot-treadle 69 by the operator.

As previously described, a single operation of shaft 53 is sufficient to operate the filling mechanisms previously described; in other words one rotation of shaft 53 and operation of the various mechanisms controlled thereby is sufficient to fill a single container or bottle; in other words, the substitution of an empty bottle or container for the one which has been charged or filled and the depression of treadle 69 are substantially simultaneously performed.

It is clearly evident that instead of employing the belt and pulley power-imparting mechanism shown in the drawings, each machine may be driven by a separate motor properly geared or operatively connected to sleeve 55; in other words, any suitable power-imparting or driving mechanism may be employed.

The construction shown and described is adapted to provide a machine of great capacity and wherein the filling action of the containers or bottles is made positive and therefore more speedy than where such filling operation depends entirely upon the action of gravity; while at the same time fluids of varying consistencies can be operated on; the quantity of fluid or material to be delivered being controlled primarily by the stroke of the piston, in conjunction with the size of the cylinder; while the discharging action is entirely automatically controlled upon the release of the foot-treadle 69.

It is also apparent that the quantity to be delivered at each operation may be readily varied by simply changing the crank stroke of the piston-rod or pitman 44; the mechanism permitting minute adjustment thereof, so as to cause predetermined, non-varying, quantities to be delivered at each operation and any waste or drip from the discharge-tube prevented.

I have shown and described what I believe to be the simplest adaptation of my invention, but modifications may be made in certain details of construction without departing from the spirit of my invention.

What I claim is:—

1. A machine of the class described, comprising a fluid-holding vessel, discharge means, fluid-control mechanism intermediate of said vessel and said means adapted to receive predetermined quantities of fluid in advance of said discharge means and to induce a flow of the predetermined quantities through said means and prevent any subsequent drip therefrom, and regulable means whereby said mechanism is actuated and positive flow of fluid from the vessel to said discharge means induced and the quantity discharged regulated.

2. A machine of the class described, comprising a fluid supply, a discharge member, valve mechanism intermediate of the supply and discharge member, a cylinder disposed intermediate of the supply and said discharge member, relative to the flow of the material, and communicating with said valve mechanism, a reciprocable piston mounted in said cylinder, means whereby the piston is reciprocated and said valve mechanism actuated, said means being so arranged that the piston will induce slight suction in the discharge member momentarily in advance of the actuation of the valve to cylinder-charging position, whereby drip from the discharge member is prevented.

3. A machine of the class described, comprising a fluid supply, a discharge member, valve mechanism intermediate of the supply and said member, a cylinder arranged in communication with said valve in advance of said discharge member, means whereby the quantity of fluid entering and discharging from said cylinder is controlled and the fluid forced into and through said discharge member and any subsequent dripping therefrom prevented and regulable means whereby the period of operation of said last mentioned means is determined and the valve mechanism controlled.

4. A machine of the class described, comprising a fluid supply, a discharge member, valve mechanism intermediate of said member and the supply, means arranged to receive the fluid from the valve mechanism in advance of said discharge member and adapted to control the flow of the fluid and force the same through said discharge member, said means being adapted to prevent any drip from the discharge member after each discharge.

5. A machine of the class described, comprising a fluid supply, a discharge member, a fluid-receiving cylinder intermediate of the supply and said member, a three-way valve whereby the flow of fluid from the supply to said member is directed into said cylinder in advance of said member, a piston in the cylinder whereby the fluid entering the cylinder is controlled and forced through said discharge member and the quantity discharged thereby controlled, and means whereby the piston is reciprocated and said valve actuated so as to alternately establish communication between the supply and the cylinder and between the latter and said discharge member, the relation between said means and the piston and between said means and the valve being such that the extreme positions of the piston are reached momentarily in advance of the extreme positions of the valve and subsequent drip from the discharge member thereby prevented.

6. A machine of the class described, comprising a fluid supply, a discharge member, valve mechanism intermediate of the supply and said member, a cylinder arranged in communication with said valve in advance of said discharge member, a piston reciprocatingly mounted in the cylinder whereby the flow of fluid to the discharge member is controlled and a slight suction in the discharge member induced after each discharge, rotating means whereby the piston is reciprocated, means intermediate of the valve mechanism and said last mentioned means whereby the valve mechanism is actuated and the flow of fluid directed into and out of the cylinder, and means whereby the extent of reciprocation of the piston induced by said rotating means may be controlled.

7. A machine of the class described, comprising a fluid-holding vessel, a discharge member, valve mechanism intermediate of the vessel and said member, a cylinder arranged in communication with said valve mechanism in advance of the discharge member, a piston reciprocatingly mounted in the cylinder whereby the fluid is forced into said discharge member and the quantity to be discharged controlled, rotating means whereby reciprocation of the piston is controlled, means, movable transversely of the rotating means, whereby the operative relation between the rotating means and the piston may be varied and the extent of reciprocation of the piston controlled, means intermediate of the rotating means and the valve mechanism whereby the latter is actuated momentarily subsequent to the extreme point of reciprocation of the piston and the flow of fluid relative to the cylinder determined and drip from the discharge member prevented, power-imparting mechanism operatively connected with the rotating means, and means whereby the operative relation between the power imparting mechanism and the rotating means is automatically controlled.

8. A machine of the class described, comprising a fluid-holding vessel, a discharge member to which the fluid is to be conveyed, valve mechanism intermediate of the vessel and said member, a cylinder arranged in communication with the valve mechanism in advance of said discharge member, a piston reciprocatingly mounted in the cylinder whereby the fluid is forced into said discharge member and the quantity to be discharged controlled, rotating means whereby reciprocation of the piston is controlled, means whereby the operative relation between the rotating means and the piston may be varied and the extent of reciprocation of the piston controlled, a pair of pivotally mounted members having operative relation with the valve and provided with angularly disposed ends and means carried by said rotating means and adapted to engage with the angularly disposed ends of said last mentioned members whereby the latter are oscillated and the valve actuated so as to alternately establish communication between said vessel and the cylinder and between said cylinder and the discharge member.

9. A machine of the class described, comprising a fluid-holding vessel, a discharge member, valve mechanism intermediate of the vessel and said member, a cylinder arranged in communication with the valve mechanism in advance of said discharge member, a piston reciprocatingly mounted in the cylinder whereby the fluid is forced into said discharge member and the quantity to be discharged controlled, rotating means provided with an adjustable pitman whereby the piston is reciprocated, means whereby the position of the pitman relative to the axis of said rotating means is controlled and the extent of reciprocation of the piston determined, a pair of pivotally mounted members operatively connected with the valve mechanism and provided with angularly disposed ends, and means carried by said rotating means adapted to engage with the angularly disposed ends of said last mentioned members whereby said members are oscillated and the valve mechanism actuated so as to alternately establish communication between said vessel and said cylinder and between said cylinder and said discharge member.

10. In a machine of the class described, a fluid supply, discharge means comprising a cup member having an elongated hollow stem one end whereof is disposed within the cup member to a point adjacent the top thereof so as to normally retain a portion of fluid within the cup member, said cup member being adapted to receive the fluid at a point beneath the orifice of the upper end of said stem, fluid-directing mechanism intermediate of the fluid supply and said discharge means, fluid-receiving and controlling means arranged in communication with said fluid-directing means in advance of the discharge means, said fluid-receiving and controlling means being adapted to induce slight suction above the fluid level in said cup member and its stem momentarily in advance of the fluid-receiving phase of said controlling means, while the discharging operation of said means is adapted to force a predetermined quantity of the fluid through said discharge means, and means whereby the fluid-receiving and controlling means and said fluid-directing mechanism are actuated.

11. A machine of the class described, comprising a fluid supply, discharge means, a cylinder, fluid-directing means adapted to successively direct the fluid from the supply into said cylinder and from the latter to the discharge means, a piston reciprocable in said cylinder, a rotating member whereby the piston is reciprocated, means for operatively connecting the piston to said rotating member, said means being adjustable on said member intermediate of its axis and periphery and the stroke of the piston thereby regulated, means intermediate of the rotating member and said fluid-directing means whereby the latter is actuated through a partial rotation of said rotating member, the actuation of said fluid-directing means being momentarily subsequent to the initial part of the reciprocating stroke of the piston whereby slight suction in the discharge means is produced on the intake stroke of the piston and drip from the discharge means prevented.

12. A machine of the class described, comprising a fluid supply, a discharge member, fluid-directing means between said supply and said member, and fluid-receiving and pressure-applying means arranged in communication with said fluid-directing means in advance of said discharge member, said fluid-receiving and pressure-applying means being adjustable to receive preselected quantities of the fluid and to force the same through said discharge member, the relation between the first and second means being such that the intake period of the second means begins momentarily in advance of the complete actuation of the first means, whereby further escape of fluid from the discharge member is prevented.

13. A machine of the class described, comprising a fluid supply, a discharge member, a valved connection between said supply and said member, fluid-receiving and pressure-applying means arranged in communication with said valved connection intermediate of the supply and said discharge member, adapted to receive a predetermined quantity of the fluid and to force the same through said discharge member, means whereby said fluid-receiving and pressure-applying means are actuated, said means being adjustable so as to control the quantity received by said first mentioned means, power-imparting mechanism, and means intermediate of said power-imparting mechanism and said last means for operatively connecting the mechanism and said last means, comprising a pair of juxtaposed members, the one being operatively connected to the power-imparting mechanism, while the other is operatively connected to the second means, pawl and ratchet connection between said pair of members, and spring-controlled operating means adapted to disrupt said pawl and ratchet connection and thereby prevent power being transmitted to the second means.

14. In a machine of the class described, a fluid supply, a discharge member, valve mechanism intermediate of the supply and said member, a cylinder arranged in communication with said valve mechanism in advance of the discharge member, a piston reciprocatingly mounted in the cylinder whereby the fluid is forced through the discharge member and the quantity controlled, a rotating member, means operatively connected with the piston and adjustable intermediate of the axis and periphery of said rotating member whereby the stroke of the piston may be regulated, means intermediate of the rotating member and said valve mechanism whereby the latter is given predetermined actuation during each complete reciprocation of the piston, power-imparting mechanism for said rotating member, means whereby said power-imparting mechanism is intermittently thrown into operative relation with said rotating member, said means comprising a pair of juxtaposed disks and pawl and ratchet connection between said disks, the one disk being secured to the power-imparting mechanism while the other disk has operative connection with the rotating member, and spring-controlled manually operated means whereby said pawl and ratchet connection may be disrupted during each complete rotation of said disks.

15. A machine of the class described, comprising a fluid supply, a discharge member, a cylinder disposed intermediate of the supply and discharge member adapted to receive and to control the flow of fluid to the discharge member, an oscillatingly mounted valve adapted to control the flow of fluid to and from said cylinder, said valve being provided with a pair of passage-ways so arranged that the direction of flow of the fluid will be controlled upon slight oscillatory movement of the valve, means whereby said passage-ways and points of communication may be drained, a piston reciprocatingly mounted in the cylinder, and means whereby the valve is oscillated, the relation between the reciprocation of the piston and oscillation of the valve being such that the former begins momentarily in advance of the latter and slight suction thereby induced in the discharge member upon the upstroke of the piston and further escape of fluid from the discharge member prevented.

16. A machine of the class described, comprising a fluid supply, a discharge member, valve mechanism intermediate of the supply of said member, a cylinder arranged in communication with the valve mechanism in advance of the discharge member, a piston reciprocatingly mounted in the cylinder whereby the fluid is forced through said discharge member and the quantity to be discharged controlled, a rotating member for actuating said piston, the point of connection between the piston and said rotating member being adjustable intermediate of the axis and periphery of said rotating member whereby the stroke of the piston may be regulated, a pair of pivotally mounted members operatively connected with the valve mechanism and each provided with cam-acting surfaces adapted to be engaged by a portion of said rotating member whereby the valve mechanism is oscillated, the relation between the reciprocation of the piston and oscillation of the valve mechanism being such that the intake stroke of the piston is momentarily in advance of the oscillation of the valve mechanism and slight suction in the discharge member induced so as to prevent further escape of fluid from the discharge member.

DAVID A. URIE.

Witnesses:
G. HEIDMAN,
F. A. FLORELL.